United States Patent
Seto et al.

(10) Patent No.: US 9,967,917 B1
(45) Date of Patent: May 8, 2018

(54) METHOD OF COMMUNICATION WITH NETWORK, AND MOBILE TERMINAL DEVICE

(71) Applicant: LENOVO (SINGAPORE) PTE. LTD., Singapore (SG)

(72) Inventors: Yuichiro Seto, Yokohama (JP);
Toshinari Sumikawa, Yokohama (JP);
Yasumichi Tsukamoto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days. days.

(21) Appl. No.: 15/647,712

(22) Filed: Jul. 12, 2017

(30) Foreign Application Priority Data

Apr. 27, 2017 (JP) ................................. 2017-087845

(51) Int. Cl.
| | |
|---|---|
| *H04B 7/185* | (2006.01) |
| *H04B 7/15* | (2006.01) |
| *H04W 88/04* | (2009.01) |
| *H04M 1/73* | (2006.01) |
| *H04W 92/08* | (2009.01) |
| *H04W 40/02* | (2009.01) |

(52) U.S. Cl.
CPC ............. *H04W 88/04* (2013.01); *H04M 1/73* (2013.01); *H04W 40/02* (2013.01); *H04W 92/08* (2013.01)

(58) Field of Classification Search
CPC ..... H04W 88/04; H04W 92/08; H04W 40/02; H04M 1/73
See application file for complete search history.

(56) References Cited

U.S. PATENT DOCUMENTS

| | | | |
|---|---|---|---|
| 9,632,556 B2* | 4/2017 | Flores Assad | ........ G06F 1/3212 |
| 9,794,904 B1* | 10/2017 | Amir | ................. H04W 56/0025 |
| 2010/0094779 A1* | 4/2010 | Ohbitsu | ................. G06Q 30/02 |
| | | | 705/400 |
| 2011/0009172 A1* | 1/2011 | Song | ................. H04M 1/72544 |
| | | | 455/573 |

(Continued)

FOREIGN PATENT DOCUMENTS

| | | |
|---|---|---|
| JP | 2012227610 A | 11/2012 |
| JP | 2013219740 A | 10/2013 |
| JP | 2014107783 A | 6/2014 |

*Primary Examiner* — Dominic Rego
(74) *Attorney, Agent, or Firm* — Shimokaji IP

(57) ABSTRACT

A mobile terminal device is connected to a network using a packet routing function of another mobile terminal device. Communication between respective mobile terminal devices can be performed in each of a plurality of tethering connection systems. When performing tethering communication, a mobile terminal device having tethering function becomes a master device and a mobile terminal device having no tethering function becomes a slave device. When both mobile terminal devices have tethering function, one mobile terminal devices becomes the master device and the other becomes the slave device. Before starting the tethering communication, state information for calculating an expected battery operating time of each mobile terminal device is acquired. A tethering connection system and a master-slave relationship are selected to maximize the expected operating time based on the remaining battery level and the expected power consumption of each mobile terminal device when starting the tethering communication.

15 Claims, 11 Drawing Sheets

(56) References Cited

U.S. PATENT DOCUMENTS

2013/0038274 A1\* 2/2013 Forsythe .............. H02J 7/0004
320/107
2015/0185292 A1\* 7/2015 Doi ................... G01R 31/3606
340/870.02

\* cited by examiner

FIG. 4

| | TETHERING POWER | |
|---|---|---|
| CONNECTION SYSTEM | 100a | 100c |
| | MASTER DEVICE | SLAVE DEVICE |
| WLAN | | |
| BLT | | |
| USB | | |

106a

| | STATE INFORMATION | |
|---|---|---|
| ITEM | 100a | 100c |
| REMAINING BATTERY LEVEL | | |
| REMAINING BATTERY RATE | | |
| CURRENT POWER CONSUMPTION | | |

| | EXPECTED OPERATING TIME (MINUTE) | |
|---|---|---|
| CONNECTION SYSTEM | 100a | 100c |
| | MASTER DEVICE | SLAVE DEVICE |
| WLAN | 30 | 50 |
| BLT | 40 | 40 |
| USB | 20 | 30 |

FIG. 8

| | TETHERING POWER | | | | 108a |
|---|---|---|---|---|---|
| CONNECTION SYSTEM | 100a | | 100b | | |
| | MASTER DEVICE | SLAVE DEVICE | MASTER DEVICE | SLAVE DEVICE | |
| WLAN | | | | | |
| BLT | | | | | |
| USB | | | | | |

| | STATE INFORMATION | | 108b |
|---|---|---|---|
| ITEM | 100a | 100b | |
| REMAINING BATTERY LEVEL | | | |
| REMAINING BATTERY RATE | | | |
| CURRENT POWER CONSUMPTION | | | |
| CURRENT COMMUNICATION SPEED | | | |
| RESERVED AMOUNT OF PACKET DATA | | | |

FIG. 11

| CONNECTION SYSTEM | EXPECTED OPERATING TIME (MINUTE) | | | |
|---|---|---|---|---|
| | MASTER-SLAVE RELATIONSHIP 1 | | MASTER-SLAVE RELATIONSHIP 2 | |
| | MASTER DEVICE 100a | SLAVE DEVICE 100b | MASTER DEVICE 100b | SLAVE DEVICE 100a |
| WLAN | 30 | 55 | 45 | 50 |
| BLT | 40 | 43 | 35 | 60 |
| USB | 20 | 35 | 25 | 40 |

METHOD OF COMMUNICATION WITH NETWORK, AND MOBILE TERMINAL DEVICE

FIELD OF THE INVENTION

The present invention relates to a technique in which a mobile terminal device communicates with a network through a relay function of another mobile terminal device.

BACKGROUND OF THE INVENTION

Mobile terminal devices such as smartphones and mobile phones can access the Internet via a wide-area wireless network (wireless WAN) provided by a telecommunications carrier. A certain type of mobile terminal device functions as a router with an access point function for a wireless WAN to allow another mobile terminal device to access the Internet. Such a communication function of the mobile terminal device is called a tethering function.

Use of the tethering function allows a mobile terminal device unable to connect to the wireless WAN to access the Internet in a location where there is no wireless LAN access point. In tethering, any one of plural mobile terminal devices operates as a master device to connect to the wireless WAN, and any other one or more mobile terminal devices operate as slave devices to connect to the wireless WAN using a relay function of the master device. For the connection between the master device and each slave device, communication standards such as wireless LAN, USB, and Bluetooth (registered trademark, which is abbreviated as BLT below) are known.

Patent Document 1 discloses a communication system that reduces power consumption when a communication terminal device having a tethering function operates as a master device. This document describes that a degree of congestion on a WLAN channel through which tethering communication is performed is acquired from an information providing device installed in a facility so that the master device will switch the channel to another. Patent Document 2 discloses a program configured to reduce the power consumption of a relay terminal to save a battery when tethering is established between the relay terminal functioning as a wireless router, such as a smartphone or a mobile phone, and client terminal such as a laptop PC or a tablet terminal.

This document describes that the relay terminal or the client terminal switches the tethering communication to either a high-speed wireless communication system with high-power consumption such as WiFi (registered trademark) or a low-speed wireless communication system with low-power consumption such as BLT depending on the communication speed or the communication traffic. Patent Document 3 discloses a mobile terminal that selects a tethering terminal appropriate for a user from among plural tethering terminals. This document describes that status information on the remaining battery level and whether the battery is on charge, the network contract details, and the like are acquired from tethering terminals to select an appropriate tethering terminal.

[Patent Document 1] Japanese Patent Application Laid-Open No. 2013-219740

[Patent Document 2] Japanese Patent Application Laid-Open No. 2014-107783

[Patent Document 3] Japanese Patent Application Laid-Open No. 2012-227610

SUMMARY OF THE INVENTION

First, the terms used in this specification will be described. Communication in which a slave device accesses a wireless WAN via a master device is called tethering communication. The tethering communication also includes access to the wireless WAN from the master device concurrently with the slave device. The connection between the master device and the slave device for tethering communication is called tethering connection, and the communication standard for a communication module used in the tethering connection is called a tethering connection system. Further, a case where two mobile terminal devices both have the tethering function is called a tethering system including the setting of a master-slave relationship and the tethering connection system.

When the master device and the slave device are both battery-operated mobile terminal devices, the devices can perform tethering communication until either one of the remaining battery level of the master device and the slave device is reduced. In other words, the battery operable times of the master device and the slave device need to be balanced to lengthen the tethering time. The master device and the slave device before the start of tethering communication consume base electric power according to the respective operational states, varying in remaining battery level.

When the tethering communication is started, the master device increases power consumption mainly due to the operation of a communication module for a wireless WAN, the operation of a communication module to communicate with the slave device, and the operation of a processor to route packets addressed to the slave device and process packets for use by itself. The slave device increases power consumption mainly due to the operation of a communication module to communicate with the master device and the operation of a processor for packet processing.

The battery operating time of each of the master device and the slave device after the start of tethering communication is decided by the remaining battery level and the power consumption after the start of the tethering communication, respectively. As the power consumption after the start of the tethering communication, power consumption increased by the tethering communication (hereinafter called tethering power) is added to the base electric power. Then, the time of enabling the tethering communication (tethering time) is decided by the expected battery operating time shorter than the other between those of the master device and the slave device.

In each mobile terminal device, various hardware and software components operate in addition to the communication module used for tethering connection to establish tethering communication. For example, suppose that a smartphone operating as a master device and a laptop PC operating as a slave device perform tethering communication. In comparison between tethering connection systems for BLT and wireless LAN, the tethering power of the laptop PC is low upon connection through the wireless LAN and the tethering power of the smartphone is low upon connection through the BLT.

Thus, the tethering time is decided by the types of master device and slave device just before the start of tethering communication, the remaining battery levels, the operating state of a system that sets base electric power after the tethering communication, and a tethering connection system adopted by the pair of the mobile terminal devices to set tethering power. Further, when two mobile terminal devices both having the tethering function are to access the wireless WAN in tethering communication, the tethering time varies depending also on which of the two mobile terminal devices is set as the master device.

Further, when monthly packet data usage exceeds a limit value specified in the contract with a telecommunications carrier for the wireless WAN service, the communication speed or the connection to the wireless WAN may be limited. Thus, in addition to the tethering time, whether there is room for contractual packet data usage is also a factor to decide on the master-slave relationship. It is not easy for a user to determine various conditions in order to select an appropriate tethering system in a short time. It is an object of the present invention to allow a mobile terminal device to connect to a network comfortably using a packet routing function of another mobile terminal device.

One aspect of the present invention provides a method in which a first mobile terminal device and a second mobile terminal device perform tethering communication. This method includes: acquiring selection information related to the battery operating time of each of the first mobile terminal device and the second mobile terminal device; calculating, using the selection information, the expected battery operating time of each of the first mobile terminal device and the second mobile terminal device when tethering communication is performed in each of plural tethering systems; and selecting a tethering system based on the expected operating time. Selecting the tethering system can include selecting a tethering connection system corresponding to a communication standard for connecting the first mobile terminal device and the second mobile terminal device, and selecting a master-slave relationship in terms of tethering communication.

Another aspect of the present invention provides a method in which a second mobile terminal device communicates with a network using a packet routing function of a first mobile terminal device capable of connecting to a wireless base station of the network. This method includes: acquiring selection information related to the battery operating time of each of the first mobile terminal device and the second mobile terminal device; calculating the expected battery operating time of each of the first mobile terminal device and the second mobile terminal device when the second mobile terminal device performs communication in each of plural connection systems connectable with the first mobile terminal device to communicate with the network; and selecting a connection system based on the expected operating time.

A still another aspect of the present invention provides a mobile terminal device capable of performing tethering communication with another mobile terminal device. This mobile terminal device includes: a mobile wireless module; plural communication modules to connect the other mobile terminal device during the tethering communication; a battery unit that supplies power to the mobile terminal device; and a control unit that calculates the expected battery operating time of each of the mobile terminal device and the other mobile terminal device during the tethering communication in each of the plural communication modules to select a communication module.

A yet another aspect of the present invention provides a mobile terminal device capable of performing communication with a network using a router function of another mobile terminal device. This mobile terminal device includes: plural communication modules for directly connecting to the other mobile terminal device; a battery unit that supplies power to the mobile terminal device; and a control unit that calculates the expected battery operating time of each of the mobile terminal device and the other mobile terminal device when the mobile terminal device communicates with the network via the other mobile terminal device in each of the plural communication modules to select a communication module.

According to the above-described aspects of the present invention, it can more lengthen the time capable of connecting each battery-operated mobile terminal device to connect to a network using a packet routing function of another battery-operated mobile terminal device. Further, according to the above-described aspects of the present invention, it can more lengthen the time capable of connecting the mobile terminal device to the network with a simple operation. Further, according to the above-described aspects of the present invention, the mobile terminal device can be connected to a network in a tethering system desired by a user.

BRIEF DESCRIPTION OF THE DRAWINGS

FIG. 4 is a table for describing an example of the data structure of a control table 105a.

FIG. 6 is a table for describing the relationship of an expected operating time and a tethering time between the mobile terminal devices 100a, 100c calculated for each tethering connection system.

FIG. 8 is a table for describing an example of the data structure of control tables 105a, 105b.

FIG. 11 is a table for describing the relationship of the expected operating time and the tethering time between the mobile terminal devices 100a, 100b calculated for each tethering system.

DETAILED DESCRIPTION OF THE INVENTION

[Network Environment]

Figure 1:
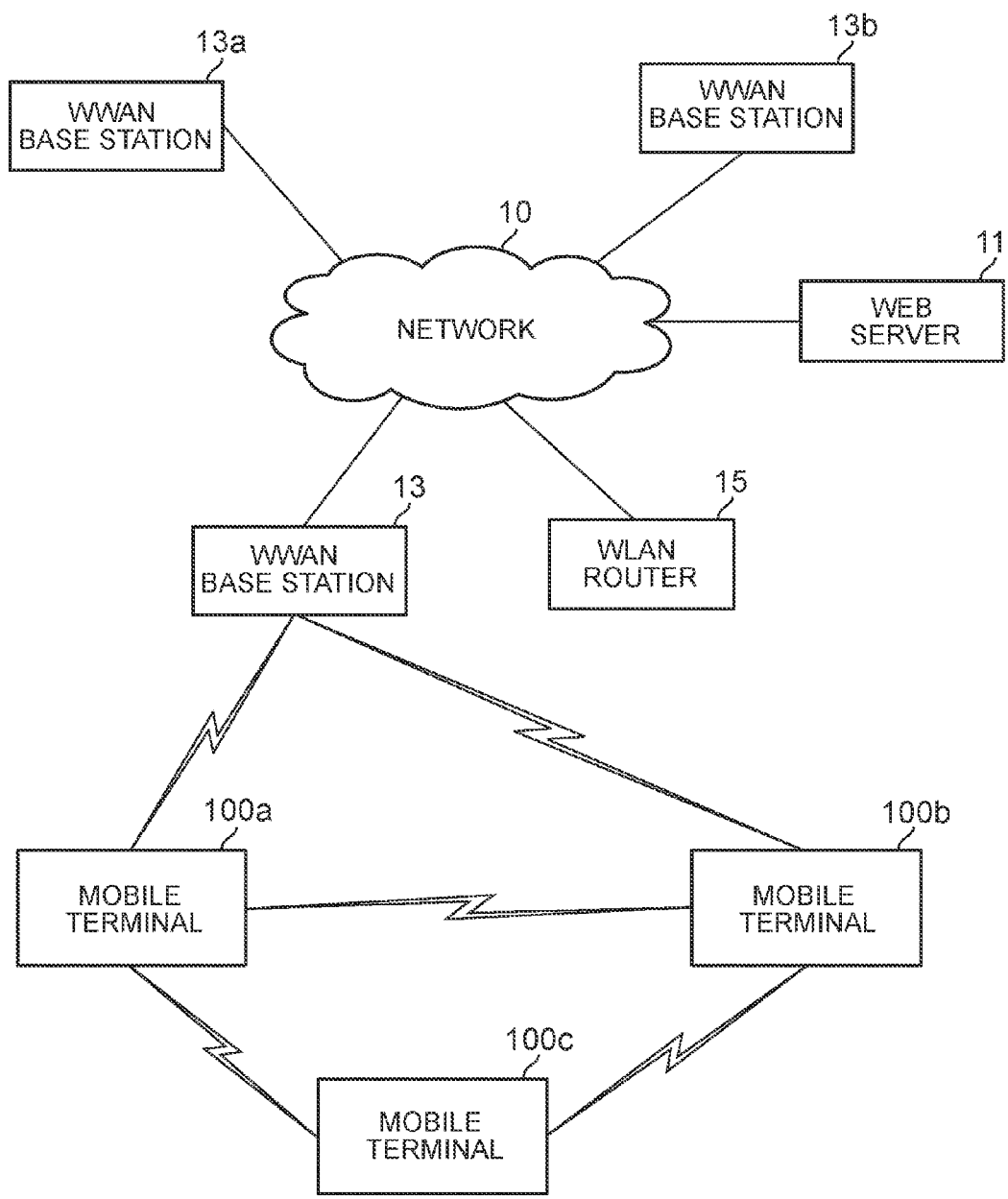
FIG. 1 is a diagram for describing a network environment for tethering communication.

FIG. 1 is a diagram for describing a network environment for tethering communication. A network 10 includes plural networks such as PAN (Personal Area Network), LAN (Local Area Network), MAN (Metropolitan Area Network), WAN (Wide Area Network), an intranet, and the Intranet linking the networks to one another. A web server 11, wireless WAN base stations 13, 13a, and 13b that adopt mobile communication standards such as 3G, LTE, and WiMAX, and a wireless router 15 as a wireless LAN access point are connected to the network 10.

The web server 11 provides Internet services to mobile terminal devices 100a to 100c connected to the network 10. The wireless base station 13 connects the mobile terminal devices 100a, 100b to the network 10 via a mobile communication network. The wireless base station 13 is installed outdoors to enable the mobile terminal devices 100a, 100b to be connected to the network 10 even in places where the mobile terminal devices 100a to 100c cannot connect to any wireless LAN.

The wireless router 15 connects the mobile terminal devices 100a to 100c to the network 10 through a wireless LAN. The wireless router 15 is installed at a hot spot as a public WLAN, or installed in a user's building or at home as part of an intranet. The communicable range of the wireless router 15 with the mobile terminal devices 100a to 100c is narrower than the communicable range of the wireless base station 13 with the mobile terminal devices 100a, 100b.

The mobile terminal devices 100a, 100b have a tethering function, both of which can connect to the wireless base station 13 and operate as master devices for tethering communication. The mobile terminal devices 100a, 100b can also connect to the wireless base station 13 independently of each other. The mobile terminal devices 100a, 100b can operate also as slave devices for tethering communication. The mobile terminal device 100c does not have any tethering function and operates always as a slave device in tethering communication.

In FIG. 1, it is illustrated that the mobile terminal devices 100a to 100c exist in an environment where the mobile terminal devices cannot be connected to the wireless router 15. In this case, in order for the mobile terminal device 100c to communicate with the network 10, it is necessary to take advantage of tethering communication using either one of the mobile terminal devices 100a, 100b as a master device. For example, each of the mobile terminal devices 100a, 100b, and 100c can be a smartphone, a tablet PC, or a laptop PC, respectively.

[Mobile Terminal Device Having Tethering Function]

Figure 2:
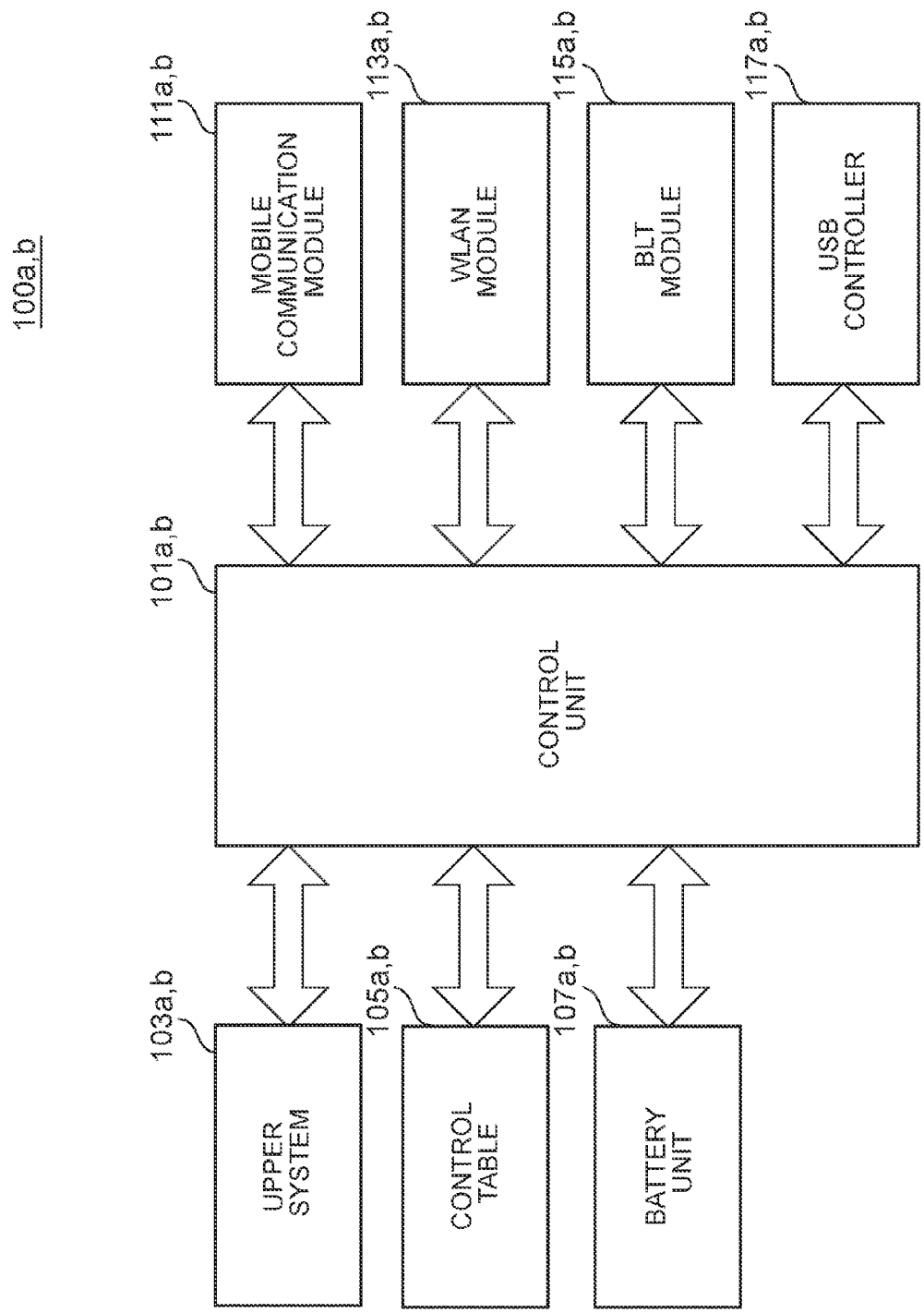
FIG. 2 is a functional block diagram for describing the configuration of each of mobile terminal devices 100a, 100b.

FIG. 2 is a functional block diagram for describing the configuration of each of the mobile terminal devices 100a, 100b. In the description of the present invention, since the mobile terminal device 100b can be described to have the same configuration as the mobile terminal device 100a, a and b are suffixed to the reference number to distinguish both from each other. The mobile terminal device 100a will be described below. An upper system 103a, a control table 105a, a battery unit 107a, a mobile communication module 111a, a WLAN module 113a, a BLT module 115a, and a USB controller 117a are connected to a control unit 101a.

The mobile communication module 111a connects the mobile terminal device 100a to the network 10 via the wireless base station 13. The WLAN module 113a, the BLT module 115a, and the USB controller 117a correspond to communication modules used in tethering connection, which can connect a master device and a slave device directly without going through the network 10. Note that the communication modules used in tethering connection do not have to be limited to those illustrated here.

The control unit 101a, the upper system 103a, and the control table 105a are configured in hardware, such as a CPU, a system memory, an input/output controller, a peripheral device, and an auxiliary storage device, in cooperation with software such as an application, an OS, and a device driver. The control unit 101a selects a tethering system, controls the mobile communication module 111a, the WLAN module 113a, the BLT module 115a, and the USB controller 117a, and performs packet protocol conversion, packet routing, and the like during tethering communication.

In order to select a tethering system, the control unit 101a acquires tethering power 106a and state information 106b (FIG. 4) from the other mobile terminal devices 100b, 100c and the battery unit 107a, and records these pieces of information in the control table 105a (FIG. 2). The control unit 101a refers to the control table 105a to select a tethering system. The tethering system includes a master-slave relationship and a tethering connection system.

The control unit 101a sends, to the other mobile terminal devices 100b, 100c, a control command to make the other mobile terminal devices 100b, 100c operate in the selected master-slave relationship or tethering connection system in order to perform tethering communication in the selected tethering system. The control unit 101a provides a user interface to allow a user to set tethering priority or communication speed priority in order to select the tethering system. The control unit 101a recognizes the relative communication speeds of plural tethering connection systems. The control unit 101a can select a mobile terminal device high in communication speed with the wireless base station 13 based on the reserved amount of packet data and the current communication speed.

The upper system 103a is configured in hardware and software that control main functions of a smartphone, a tablet terminal, or a laptop PC. The upper system 103a holds data corresponding to the current communication speeds of the mobile communication module 111a and the wireless base station 13, and the reserved amount of packet data. The battery unit 107a is composed of a battery, a charger, a DC/DC converter, and the like to supply power to the hardware of the mobile terminal device 100a. The battery unit 107a holds data corresponding to the remaining battery level, the remaining rate, and the current power consumption.

[Mobile Terminal Device Having No Tethering Function]

Figure 3:
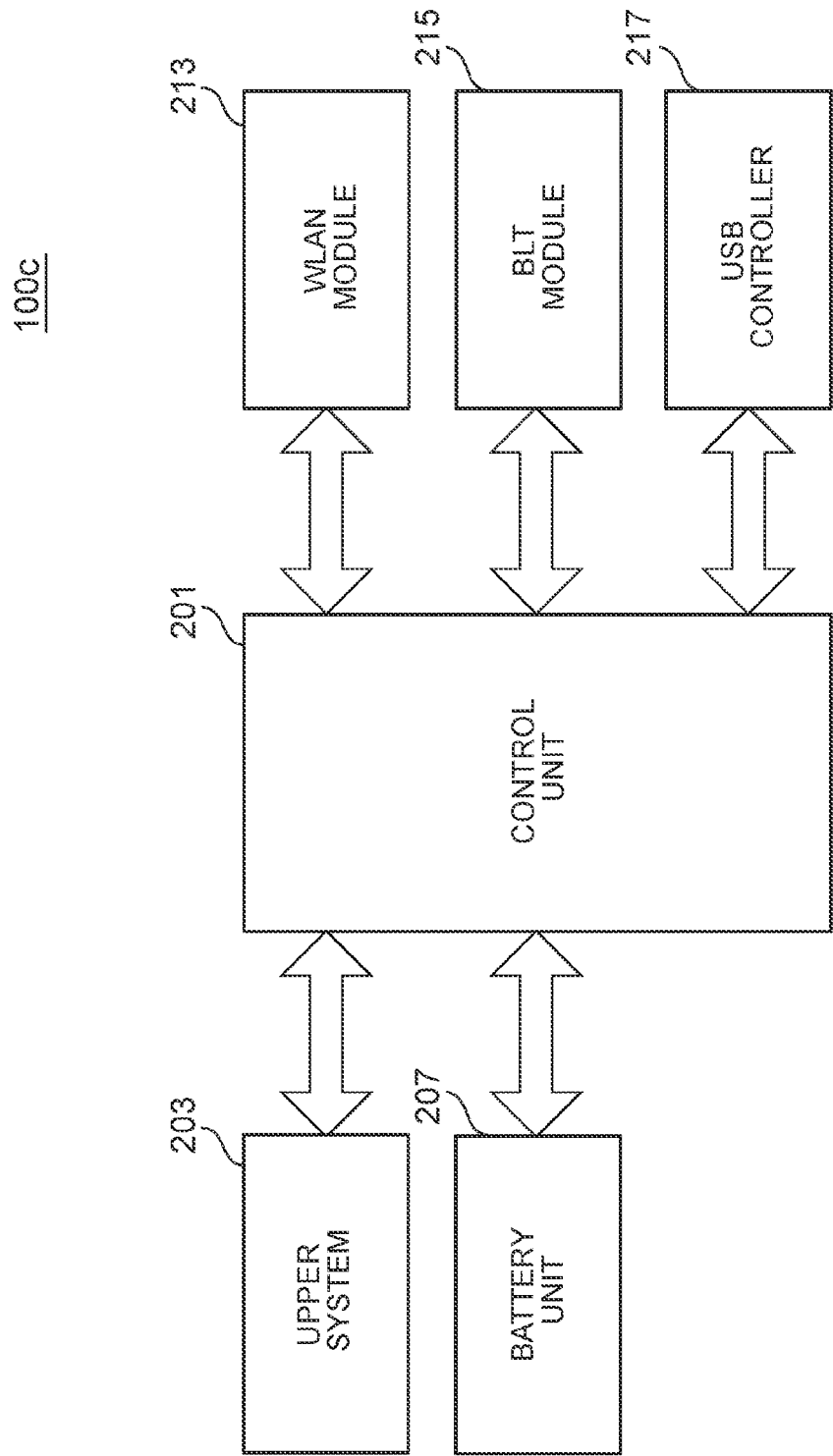
FIG. 3 is a functional block diagram for describing the configuration of a mobile terminal device 100c.

FIG. 3 is a functional block diagram for describing the configuration of the mobile terminal device 100c. In the embodiment, the mobile terminal device 100c can be described to have a configuration in which the mobile communication module 111a and the control table 105a of the mobile terminal device 100a are removed. In another example, the mobile terminal device 100c may include a control table.

A control unit 201, an upper system 203, a battery unit 207, a WLAN module 213, a BLT module 215, and a USB controller 217 correspond to the control unit 101a, the upper system 103a, the battery unit 107a, the WLAN module 113a, the BLT module 115a, and the USB controller 117a, respectively. Since the mobile terminal device 100c operates as a slave device during tethering communication, the function of the control unit 201 may differ from that of the control unit 101. In this regard, description will be made later with reference to a flowchart of FIG. 5.

[Control Table]

FIG. 4 is a table for describing an example of the data structure of the control table 105a. In the control table 105a, the tethering power 106a and the state information 106b for each tethering connection system are registered, which are necessary to calculate an expected operating time of each of the mobile terminal devices 100a, 100c after the start of tethering communication. The tethering power 106a corresponds to static data capable of being acquired by testing at a factory or a user's use environment.

The state information 106b corresponds to dynamic data varying depending on the states of the mobile terminal devices 100a, 100c immediately before the start of the tethering communication. The tethering power 106a of the mobile terminal device 100a is a recorded value when the mobile terminal device 100a operates as a master device, and the tethering power 106a of the mobile terminal device 100c is a recorded value when the mobile terminal device 100c operates as a slave device. One example of the state information 106b includes the remaining battery level, the remaining battery rate, and the current power consumption of each of the mobile terminal devices 100a, 100c.

The remaining battery rate corresponds to a ratio of the remaining battery level to the rating capacity or the full charged capacity. The current power consumption can be represented by moving average power during the latest predetermined time period. The control unit 101a acquires its own state information 106b from the battery unit 107a, and acquires the state information 106b from the mobile terminal device 100c. In response to a request, the mobile terminal device 100c sends the mobile terminal device 100a the state information 106b acquired from the battery unit 207.

[Tethering Communication when Master Device is Fixed]

Figure 5:
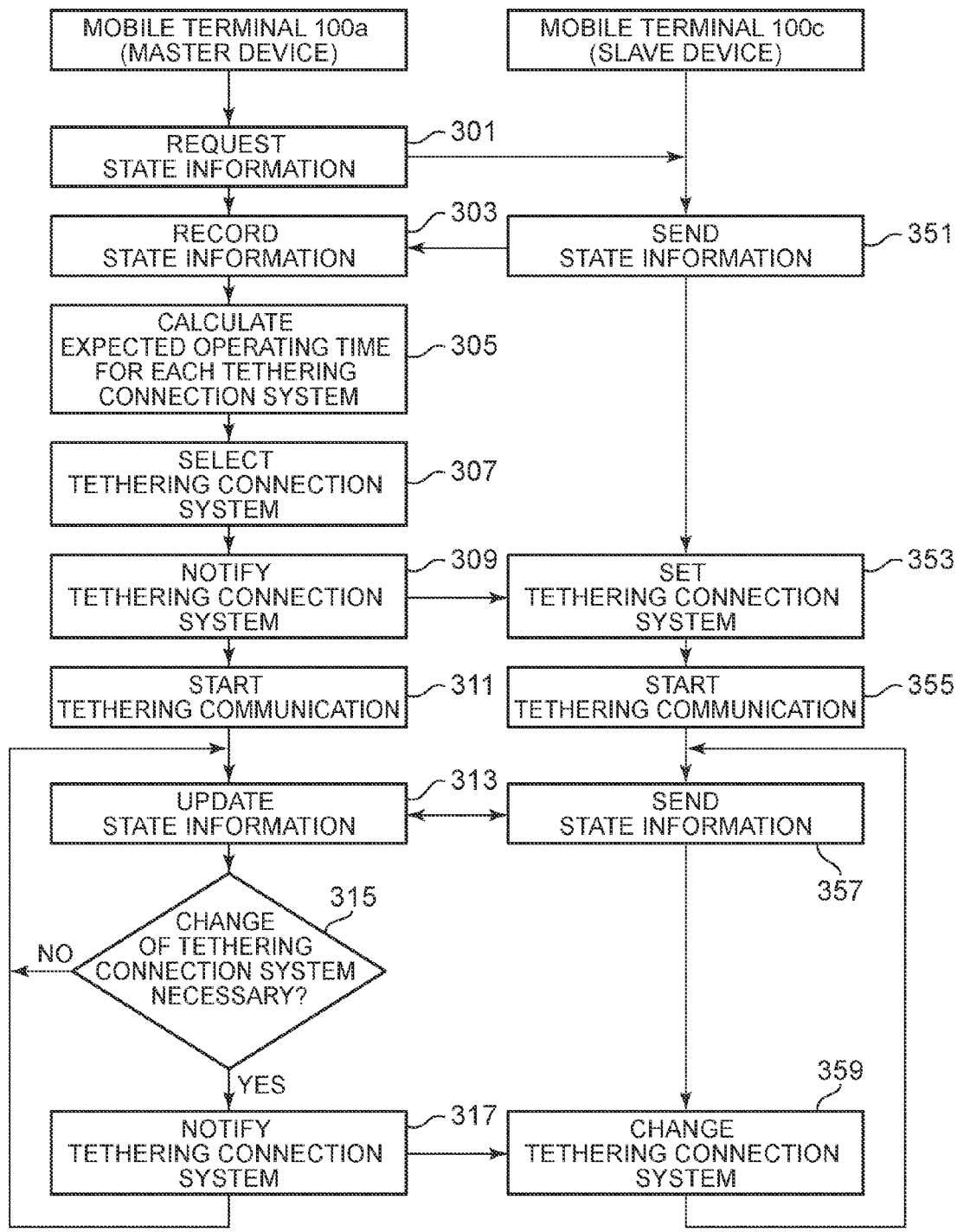
FIG. 5 is a flowchart illustrating an example of a procedure when the mobile terminal device 100a having a tethering function and the mobile terminal device 100c having no tethering function perform tethering communication.

FIG. 5 is a flowchart illustrating an example of a procedure when the mobile terminal device 100a having the tethering function and the mobile terminal device 100c having no tethering function perform tethering communication. The mobile terminal devices 100a and 100c are grouped using a common group identifier to apply the present invention, and mutual authentication to perform tethering communication is also completed. Further, the mobile terminal device 100a acquires tethering power 106a (FIG. 4) of the mobile terminal device 100c during grouping and registered the tethering power 106a in the control table 105a. The mobile terminal devices 100a and 100c are located within a distance capable of establishing tethering connection.

In block 301, a user operates the mobile terminal device 100a to request the state information 106b in order to perform tethering communication. When the mobile terminal device 100a and the mobile terminal device 100c are not directly connected at this point of time, the control unit 101a can connect to the mobile terminal device 100c directly or indirectly via the WLAN module 113a, the BLT module 115a or any other communication module to request the state information.

In block 351, the control unit 201 of the mobile terminal device 100c sends the mobile terminal device 100a the state information 106b acquired from the battery unit 207. In block 303, the control unit 101a records, in the control table 105a, its own state information 106b and the state information 106b received from the mobile terminal device 100c. In block 305, the control unit 101a calculates, for each tethering connection system, an expected battery operating time of each of the mobile terminal devices 100a, 100c from the tethering power 106a and the state information 106b in the control table 105a.

The expected operating time can be calculated from the expected power consumption after the start of tethering communication, which is calculated by adding, to the current power consumption (base electric power), tethering power corresponding to the tethering connection system, and the remaining battery level. When it is made clear that the mobile terminal device 100a as the master device operates only as a router, i.e., the user does not use the mobile terminal device 100a during the tethering communication, the control unit 101a may adjust the expected power consumption by subtracting, from the current power consumption, the power consumption of input/output devices, such as a touch screen, a camera, and a microphone, equipped in the mobile terminal device 100a.

The control unit 101a calculates, for each tethering connection system, the expected operating time of each of the mobile terminal devices 100a, 100c, respectively. FIG. 6 illustrates the expected operating time of each of the mobile terminal device 100a operating as the master device and the mobile terminal device 100c operating as the slave device, which are calculated for each tethering connection system, respectively. Note that each numerical value illustrated in FIG. 6 is just illustrative example to describe a method of acquiring the tethering time from the expected operating time, and not to indicate the magnitude relationship of the tethering power of each tethering connection system between the mobile terminal device 100a and the mobile terminal device 100c.

The control unit 101a determines one expected operating time shorter than the other between the mobile terminal devices 100a, 100c, which are calculated for each tethering connection system, to be the tethering time for the tethering connection system. In block 307, the control unit 101a adopts a tethering connection system longest in tethering time among the WLAN module 113a, the BLT module 115a, and the USB controller 117a. In this example, use of the BLT modules 115a, 215 most lengthens the tethering time.

Note that the user can also preset, in the control unit 101a, the selection of either tethering time priority or communication speed priority for the tethering connection system. In this case, the control unit 101a applies block 307 only when the tethering time priority is set. When the communication speed priority is set, a module, pre-registered as a connection system high in communication speed, for example, the WLAN module 113a can be selected.

In block 309, the control unit 101a sends a control command to make the mobile terminal device 100c operated in the selected tethering connection system. On this occasion, the control unit 101a may display the tethering time and the communication speed for each tethering connection system on a display of the mobile terminal device 100a to allow the user to select a tethering connection system. Further, when the USB controller 117a is selected, the control unit 101a can display a message on the display to urge the user to establish a connection via a USB cable.

The control unit 201 that received the control command in block 353 operates a communication module for the instructed tethering connection system, or a user of the mobile terminal device 100c connects the USB cable in some cases. In block 311, the control unit 101a operates the communication module for the selected tethering connection system, and further connects the mobile communication module 111a to the wireless base station 13 to enable the tethering function. Since both communication modules are mutually authenticated and registered beforehand, tethering communication is automatically started in blocks 311 and 355.

The control unit 101a bidirectionally converts a packet protocol for the selected tethering connection system and a packet protocol for the wireless base station 13 to relay packet transfer between the wireless base station 13 and the mobile terminal device 100c. Further, during tethering communication, the control unit 101a relays packet transfer between the upper system 103a and the wireless base station 13. After the start of the tethering communication, the expected power consumption of each of the mobile terminal devices 100a, 100c may become different from the value acquired in block 305.

In blocks 313, 357, the control unit 101a receives the state information 106b periodically from the mobile terminal device 100c and the battery unit 107a to update the control table 105a. In block 315, the control unit 101a calculates a tethering connection system having the longest tethering time at the time in the same procedure as that of blocks 305 and 307. When determining that it is better to change the tethering connection system in order to lengthen the tethering time, the control unit 101a sends a control command to change the tethering connection system in blocks 317 and 359. The procedure of blocks 317 and 359 follows the procedure of blocks 305 to 309 and 353.

In the above procedure, the mobile terminal device 100a operating as the master device decides on the tethering connection system, but the mobile terminal device 100c operating as the slave device may decide on the tethering connection system. In this case, the procedure of corresponding blocks in FIG. 5 is replaced between the mobile terminal devices 100a and 100c, and a control command to be sent from the mobile terminal device 100c also includes an instruction to connect the mobile terminal device 100a to the wireless base station 13. Alternatively, either one of the mobile terminal devices, which determines that the remaining battery rate is high in blocks 303 and 351, may decide on the tethering connection system. Even a case where it is decided beforehand that the mobile terminal device 100a is set as the master device and the mobile terminal device 100b is set as the slave device, the tethering communication can be performed in the same procedure.

[Tethering Communication when Selection of Master-Slave Relationship is Included]

Figure 7:
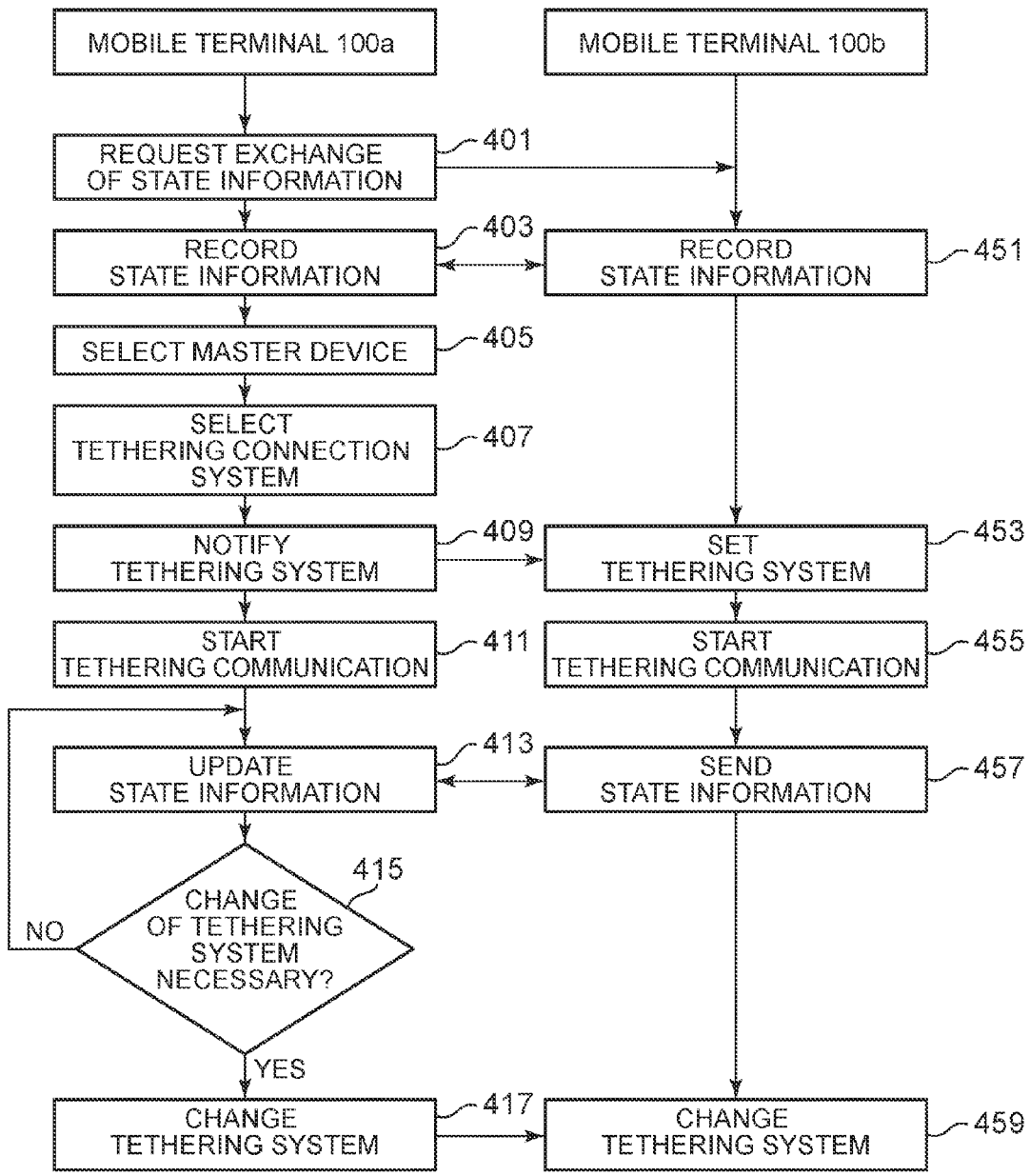
FIG. 7 is a flowchart illustrating an example of a procedure when mobile terminal devices 100a, 100b both having a tethering function perform tethering communication.

Another embodiment of the present invention can be applied to a case where either one of the mobile terminal devices 100a, 100b both having the tethering function connects the other mobile terminal device to the wireless base station 13 to perform tethering communication. FIG. 7 is a flowchart illustrating an example of a procedure when the mobile terminal devices 100a and 100b perform tethering communication. Methods of connecting the mobile terminal devices 100a and 100b to the network 10 in such an environment that the mobile terminal devices 100a and 100b cannot access any wireless LAN include a method of connecting each of the mobile communication modules 111a and 111b individually to the wireless base station 13 without performing tethering communication, and a method of setting either the mobile terminal device 100a or the mobile terminal device 100b as the master device to perform tethering communication.

As reasons for using tethering communication, rather than individual communication, when each user accesses the network 10, there are a case where sufficient throughput cannot be secured in individual communication because the communication state of either one of the mobile communication modules 111a and 111b is bad, and a case where the user does not desire individual communication for the reason of contractual agreement with a mobile communications carrier. Further, in general, since the mobile communication modules 111a and 111b consume more power than the WLAN modules 113a and 113b, the battery operating time can be lengthened when each mobile terminal device communicating with the network 10 operates as the slave device through tethering communication, rather than the individual communication.

Here, a procedure when each user performs tethering communication rather than individual communication for some reasons including those mentioned above will be described. When the mobile terminal devices 100a and 100b perform tethering communication, a tethering connection system and a tethering system including the identification of a master-slave relationship need to be selected. In the meantime, there is a case where a limit is set on monthly packet data usage under the communication contract between the mobile communications carrier and the user. In this case, a so-called packet limiting function may be so introduced that after the monthly packet data usage reaches the limit, the packet communication is stopped or the communication speed is reduced.

The packet limiting function is a measuring factor in selecting a master device to perform high-speed, comfortable tethering communication. The amount of packet data before the packet limiting function is enabled is called the reserved amount of packet data. The reserved amount of packet data is held by the upper system 103a, 103b. Each user can set the reserved amount of packet data for tethering communication to a value smaller than that of the reserved amount of packet data when the packet limiting function is enabled. Further, the user may want to perform tethering communication by giving priority to the communication speed rather than the tethering time. FIG. 7 illustrates a procedure including such a factor as well.

Since many blocks in the procedure of FIG. 7 are common to those in the procedure of FIG. 5, the description thereof will be simplified or omitted below unless the description affects the understanding thereof. In block 401, a user operates either of the mobile terminal devices 100a and 100b to cause the mobile terminal devices 100a and 100b to start tethering communication. Here, although the description will be made in a case where the user operates the mobile terminal device 100a, a case where the mobile terminal device 100b is operated can also be understood from this procedure. In blocks 403 and 451, the control unit 101a records, in the control table 105a, state information 108b received from the mobile terminal device 100b and its own state information 108b acquired from the battery unit 107a (see FIG. 8).

FIG. 8 is a table for describing an example of the data structure of the control table 105a. In the control table 105a, tethering power 108a and state information 108b for each tethering connection system when the mobile terminal devices 100a and 100b operate respectively as the master device and the slave device are registered. In addition to the state information 106b, the current communication speed and the reserved amount of packet data of each of the mobile terminal devices 100a and 100b for the wireless base station 13 at the time are registered in the state information 108b.

The current communication speed can be the latest average communication speed when the mobile communication module 111a, 111b directly connects to the wireless base station 13. The control unit 101a, 101b can acquire the communication speed and the reserved amount of packet data from the upper system 103a, 103b.

In block 405, the control unit 101a refers to the control table 105a to select either one of the mobile terminal devices 100a and 100b as the master device. The procedure of block 405 will be described with reference to FIG. 9 and FIG. 10. After moving to FIG. 9, the control unit 101a compares and evaluates in block 501 the reserved amount of packet data between the mobile terminal devices 100a and 100b based on the state information 108b to compare and evaluate the current communication speed in block 502.

Figure 10:
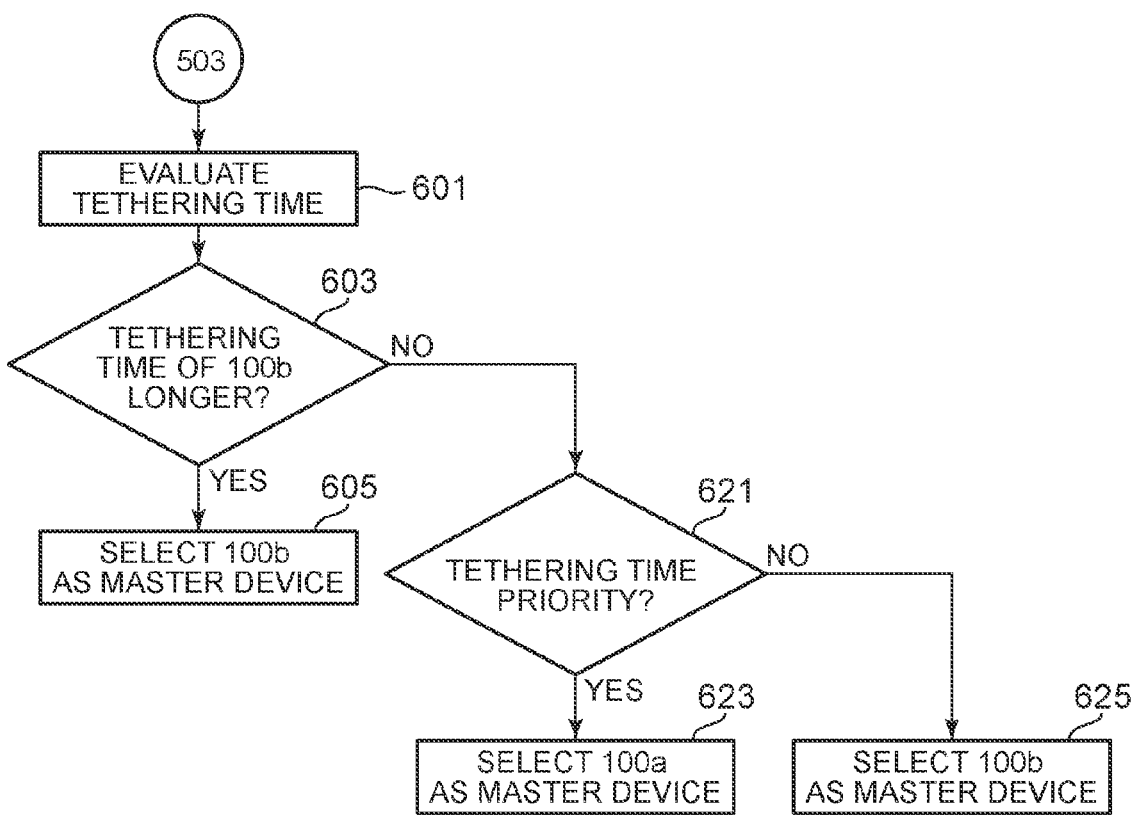
FIG. 10 is a flowchart illustrating an example of a procedure for describing the procedure of evaluating the communication speed and the tethering time to select the master device.

The blocks 501 and 502 correspond to a procedure for determining, based on the reserved amount of packet data and the current communication speed, either of the mobile terminal devices 100a and 100b to be able to perform tethering communication at a high communication speed. As an example, when both have reserved amounts of packet data, the control unit 101a can determine a mobile terminal device having a larger reserved amount of packet data to be suitable as a master device, while when either one of the mobile terminal devices has a reserved amount of packet data, the control unit 101a can determine the mobile terminal device to be suitable as the master device. When both have no reserved amount of packet data, the control unit 101a can determine a mobile terminal device high in current communication speed to be suitable as the master device.

when the control unit 101a determines in block 503 that the communication speed of the mobile terminal device 100a is higher, the procedure proceeds to block 505, while when the control unit 101a determines that the communication speed of the mobile terminal device 100b is higher, the procedure proceeds to block 601 in FIG. 10. In block 505, the control unit 101a refers to the tethering power 108a and the state information 108b in FIG. 8 to calculate an expected operating time in the same procedure as that of block 305 in FIG. 5.

The control unit 101a calculates, for each tethering connection system, the expected operating time of each of the mobile terminal devices 100a and 100b when operating as the master device and when operating as the slave device, respectively, to acquire a tethering time. FIG. 11 illustrates each expected operating time in each tethering connection system, calculated for two master-slave relationships when the mobile terminal device 100a is the master device (master-slave relationship 1) and when the mobile terminal device 100b is the master device (master-slave relationship 2). Note that each numerical value illustrated in FIG. 11 is just illustrative example to describe a method of acquiring the tethering time from each expected operating time, and not to indicate the magnitude relationship of the tethering power of each tethering connection system between the mobile terminal device 100a and the mobile terminal device 100b.

In the example of FIG. 11, when the mobile terminal device 100b is set as the master device and the WLAN module 113a, 113b is set as the tethering connection system, the tethering time is most lengthened. In block 507, when the control unit 101a determines that the master device capable of lengthening the tethering time is the mobile terminal device 100a, the procedure proceeds to block 509, while when the control unit 101a determines that the master device is the mobile terminal device 100b, the procedure proceeds to block 521.

When proceeding to block 509, since it is advantageous to set the mobile terminal device 100a as the master device from both points of view of the communication speed and the tethering time, the control unit 101a selects the mobile terminal device 100a as the master device. When proceeding to block 521, it is advantageous to set the mobile terminal device 100a as the master device from the viewpoint of the communication speed, but it is advantageous to set the mobile terminal device 100b as the master device from the viewpoint of the tethering time.

In consideration of a case where evaluations from two points of view contradict each other, the user can set, in the control unit 101a, tethering time priority and communication speed priority. When the tethering time priority is set, the procedure proceeds to block 523 in which the control unit 101a selects the mobile terminal device 100b as the master device. When the communication speed priority is set, the procedure proceeds to block 525 in which the control unit 101a selects the mobile terminal device 100a as the master device.

FIG. 10 illustrate a procedure of selecting a master device when the communication speed of the mobile terminal device 100b is high. Like in the procedure of FIG. 9, when evaluations in terms of the communication speed and the tethering time match each other, the mobile terminal device 100b is selected as the master device, while when the evaluations contradict each other, the master device is selected in block 623 or 625 based on the setting of the tethering time priority or the communication speed priority in block 621. Returning to FIG. 7, the control unit 101a selects a tethering connection system in block 407 following the master-slave relationship.

Figure 9:
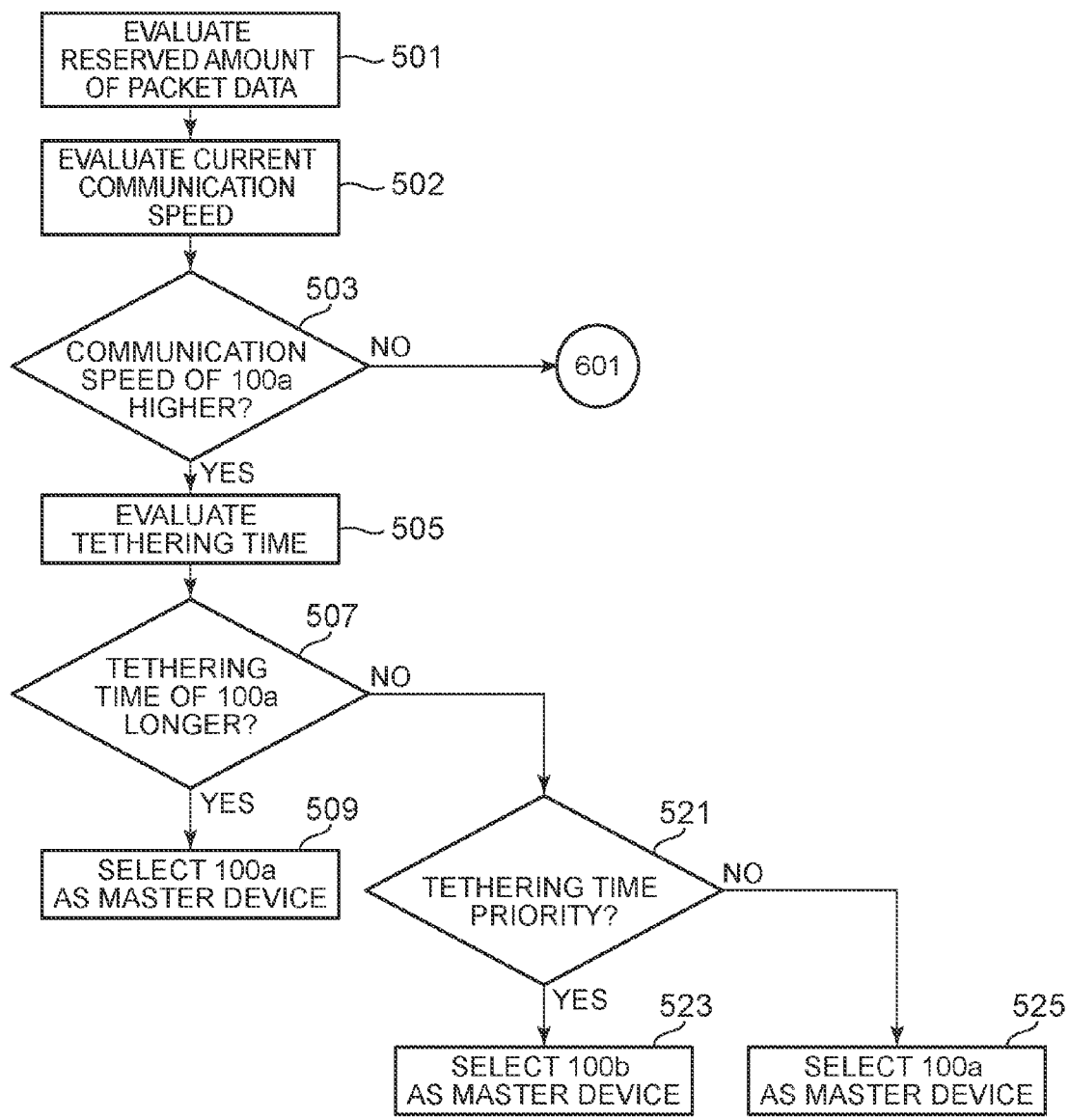
FIG. 9 is a flowchart illustrating an example of a procedure for describing a procedure of evaluating a communication speed and a tethering time to select a master device.

When a master device whose evaluation based on the tethering time and evaluation based on the communication speed match each other is selected in the procedure of block 509 in FIG. 9 or block 605 in FIG. 10, the tethering connection system when the master device is determined from the tethering time in block 507, 603 is selected. When the evaluation based on the tethering time and the evaluation based on the communication speed contradict each other, and the master device is selected based on the communication speed priority in block 525, 625, the control unit 101a can select a tethering connection system recognized to be the highest communication speed beforehand, for example, the WLAN module 113a, 113b.

Further, when the evaluation based on the tethering time and the evaluation based on the communication speed contradict each other, and the master device is selected based on the tethering time priority in block 523, 623, the control unit 101a can select a tethering connection system in which a master device advantageous from the viewpoint of the tethering time is determined in block 507, 603. In block 409, the control unit 101a sends a control command to instruct the mobile terminal device 100b about the selected tethering system. The master-slave relationship and the tethering connection system are included in the instructed tethering system.

The control unit 101b that received the control command in block 453 operates the communication module in the instructed tethering connection system. In block 411, the control unit 101a operates the communication module in the selected tethering connection system, and further, when operating as the master device, the control unit 101a connects the mobile communication module 111a to the wireless base station 13 to enable the tethering function. When the mobile terminal device 100b operates as the master device, the control unit 101b connects the mobile communication module 111b to the wireless base station 13 to enable the tethering function.

When either the WLAN module 113a, 113b or the BLT module 115a, 115b is selected, tethering communication is automatically started in block 411, 455. After the start of the tethering communication, the power consumption, the communication speed, and the reserved amount of packet data of each of the mobile terminal devices 100a, 100b may become different from the values acquired in block 405. In blocks 413, 457, for example, the control unit 101a operating as the master device receives the state information 108b periodically from the mobile terminal device 100b and the battery unit 107a to update the control table 105a.

In block 415, the control unit 101a determines whether the tethering system is to be changed or not based on the setting of the tethering time priority or the communication speed priority and the control table 105a in the same procedure as that of blocks 405, 407. When it is determined that the tethering system needs to be changed in terms of the tethering time or the communication speed, the tethering system is changed in block 417, 459. At this time, the control unit 101a can also determine to end the tethering communication session and connect respective mobile terminal devices to the wireless base station 13 in individual communication.

The procedure of block 417, 459 follows the procedure of blocks 405 to 409, and 453. The tethering system may also be decided by either of the mobile terminal devices determined to be high in remaining battery rate in block 403, 451. Although the example in which either of the mobile terminal devices 100a and 100b decides on the tethering system is described above, a server connected to the network 10 may also acquire the tethering power 108a and the state information 108b in the same procedure to decide on the tethering system.

While the specific embodiments of the present invention as illustrated in the drawings are described so far, the present invention is not limited to the embodiments illustrated in the drawings. It is needless to say that even any other known configuration can be adopted as long as the effects of the present invention are obtained. For example, the tethering communication is exemplified, but the present invention can also be applied to a case where a mobile terminal device is connected to a network other than the mobile communication network using the access point function and the router function of another battery-operated mobile terminal device.

We claim:

1. A method in which a first mobile terminal device and a second mobile terminal device perform tethering communication, comprising:
   acquiring selection information related to a battery operating time of each of the first mobile terminal device and the second mobile terminal device;
   calculating, using the selection information, an expected battery operating time of each of the first mobile terminal device and the second mobile terminal device when tethering communication is performed in each of a plurality of tethering systems; and
   selecting a tethering system based on the expected battery operating time.

2. The method according to claim 1, wherein the selection information includes power consumption of each of the first mobile terminal device and the second mobile terminal device, which power consumption is increased by the tethering communication in each of the tethering systems.

3. The method according to claim 2, wherein selecting the tethering system includes selecting any one of a plurality of tethering connection systems corresponding to communication standards for connecting the first mobile terminal device and the second mobile terminal device.

4. The method according to claim 3, wherein selecting the tethering system includes selecting the tethering connection system having the longest expected battery operating time.

5. The method according to claim 3, wherein selecting the tethering system includes selecting a master-slave relationship for the tethering communication.

6. The method according to claim 5, wherein:
   the selection information includes a communication speed of each of the first mobile terminal device and the second mobile terminal device with a wireless base station, and
   selecting the master-slave relationship includes evaluating the communication speed and the expected battery operating time.

7. The method according to claim 6, wherein, when a selected master device is long in the expected battery operating time and a selected master device is high in the communication speed do not match each other, selecting the master-slave relationship includes selecting a master device based on a set expected battery operating time priority or a set communication speed priority.

8. The method according to claim 7, wherein selecting the tethering system includes selecting, from the plurality of tethering connection systems, a tethering connection system having the longest expected battery operating time of a master device selected when the expected battery operating time priority is set.

9. The method according to claim 6, wherein selecting the master-slave relationship includes comparing reserved amounts of packet data for a packet limiting function when a mobile terminal device high in communication speed is selected as a master device.

10. The method according to claim 1, further comprising calculating the expected battery operating time of the first mobile terminal device and the second mobile terminal device based on the selection information acquired, after the start of the tethering communication, to change the tethering system.

11. A method in which a second mobile terminal device communicates with a network using a packet routing function of a first mobile terminal device capable of connecting to a wireless base station on the network, comprising:
   acquiring selection information related to a battery operating time of each of the first mobile terminal device and the second mobile terminal device;
   calculating an expected battery operating time of each of the first mobile terminal device and the second mobile terminal device when the second mobile terminal device performs communication in each of a plurality of connection systems connectable with the first mobile terminal device to communicate with the network; and
   selecting a connection system based on the expected battery operating time.

12. A mobile terminal device for performing tethering communication with another mobile terminal device, comprising:
   a mobile wireless module;
   a plurality of communication modules to connect with the another mobile terminal device during the tethering communication;
   a battery unit that supplies power to the mobile terminal device; and
   a control unit that calculates an expected battery operating time of each of the mobile terminal device and the another mobile terminal device, during the tethering communication in each of the plurality of communication modules, to select a communication module.

13. The mobile terminal device according to claim 12, wherein the control unit sends the another mobile terminal device a command to set a communication standard of the selected communication module.

14. The mobile terminal device according to claim 12, wherein the another mobile terminal device includes a mobile wireless module, and wherein the control unit selects, as a master device, a mobile terminal device having a longer expected battery operating time.

15. The mobile terminal device according to claim 14, wherein the control unit selects, as the master device, a mobile terminal device higher in communication speed with a wireless base station.

\* \* \* \* \*